United States Patent
Duggirala et al.

(10) Patent No.: US 10,075,413 B2
(45) Date of Patent: Sep. 11, 2018

(54) ADAPTIVE OVERLAY NETWORKING

(71) Applicant: CLOUDISTICS, INC., Reston, VA (US)

(72) Inventors: Vedavyas Duggirala, Sterling, VA (US); Srinidhi Varadarajan, Blacksburg, VA (US)

(73) Assignee: CLOUDISTICS, INC., Reston, VI (US)

( * ) Notice: Subject to any disclaimer, the term of this patent is extended or adjusted under 35 U.S.C. 154(b) by 211 days.

(21) Appl. No.: 14/453,980

(22) Filed: Aug. 7, 2014

(65) Prior Publication Data

US 2015/0106489 A1    Apr. 16, 2015

Related U.S. Application Data

(60) Provisional application No. 61/889,457, filed on Oct. 10, 2013.

(51) Int. Cl.

| H04L 29/12 | (2006.01) |
|---|---|
| H04L 12/715 | (2013.01) |
| G06F 9/455 | (2018.01) |
| H04L 12/741 | (2013.01) |
| H04L 12/46 | (2006.01) |

(52) U.S. Cl.
CPC ...... *H04L 61/2503* (2013.01); *G06F 9/45558* (2013.01); *H04L 12/4641* (2013.01); *H04L 45/64* (2013.01); *H04L 45/74* (2013.01); *H04L 61/103* (2013.01); *H04L 61/2084* (2013.01); *H04L 61/2521* (2013.01); *G06F 2009/45595* (2013.01)

(58) Field of Classification Search
None
See application file for complete search history.

(56) References Cited

U.S. PATENT DOCUMENTS

| 8,606,872 | B1 | 12/2013 | Reitnour et al. |
|---|---|---|---|
| 9,356,860 | B1* | 5/2016 | Dickinson ............. H04L 9/0643 |
| 2004/0162914 | A1 | 8/2004 | St. Pierre et al. |
| 2009/0187756 | A1 | 7/2009 | Nollet et al. |
| 2010/0246443 | A1* | 9/2010 | Cohn .................. H04L 12/4641 370/255 |
| 2011/0029688 | A1 | 2/2011 | Jung et al. |
| 2011/0110377 | A1 | 5/2011 | Alkhatib et al. |
| 2011/0119748 | A1 | 5/2011 | Edwards et al. |
| 2011/0246669 | A1 | 10/2011 | Kanada et al. |
| 2011/0320821 | A1 | 12/2011 | Alkhatib et al. |
| 2012/0089811 | A1* | 4/2012 | Sawai ................. G06F 12/1027 711/207 |
| 2012/0250682 | A1 | 10/2012 | Vincent et al. |
| 2013/0004631 | A1 | 2/2013 | Biswas et al. |
| 2013/0044629 | A1 | 2/2013 | Biswas et al. |
| 2013/0091261 | A1 | 4/2013 | Barabash et al. |

(Continued)

FOREIGN PATENT DOCUMENTS

JP    2013-533659    3/2013

OTHER PUBLICATIONS

International Search Report issued in International Application No. PCT/US2014/50067 dated Nov. 6, 2014.

(Continued)

*Primary Examiner* — Umar Cheema
*Assistant Examiner* — Anthony T Rotolo
(74) *Attorney, Agent, or Firm* — DLA Piper LLP US (57) ABSTRACT

An adaptive overlay network and method of operating the same. A location table is used to directly map logical addresses of machines (e.g., virtual or physical) within the network to their respective physical addresses alleviating the need for encapsulation and virtual switches to perform communications between these machines.

12 Claims, 3 Drawing Sheets

(56) References Cited

U.S. PATENT DOCUMENTS

| | | | |
|---|---|---|---|
| 2013/0142079 A1 | 6/2013 | Barabash et al. | |
| 2013/0266015 A1 | 10/2013 | Qu et al. | |
| 2014/0119373 A1* | 5/2014 | Barabash | G06F 9/45558 370/392 |
| 2015/0131669 A1 | 5/2015 | Biswas et al. | |
| 2015/0312054 A1* | 10/2015 | Barabash | H04L 12/4633 370/392 |

OTHER PUBLICATIONS

Written Opinion issued in International Application No. PCT/US2014/50067 dated Nov. 6, 2014.
European Search Report issued in EP 16172819.1 dated Oct. 14, 2016.
Office Action issue in EP 16172819.1 dated Dec. 19, 2016.
European Search Report issued in EP 14853054 dated Jul. 13, 2017.
European Search Report issued in EP 16172819.1 dated Mar. 2, 2018.
Office Action issue in Application No. 2016-521979 dated Jul. 3, 2018.
English Translation of Office Action issue in Application No. 2016-521979 dated Jul. 3, 2018.
Sasaki, C., et al., "Implementation and Scalability Evaluation of LISP-based Instant VPN Service", The Institute of Electronics, Information and Communication Engineers, 12 Pages, (Sep. 2012).
English Language Abstract of JP 2013-533659 published Mar. 21, 2013.

* cited by examiner

ADAPTIVE OVERLAY NETWORKING

CROSS-REFERENCE TO RELATED APPLICATION

This application claims priority from U.S. Provisional Application Ser. No. 61/889,457 filed on Oct. 10, 2013, the entirety of which is incorporated herein by reference.

BACKGROUND

Over the last decade, server virtualization has radically transformed application and data center architectures growing from a niche market to a multi-billion dollar industry. By using an abstraction of a virtual machine, virtualization technology decouples the tight binding between the operating system and the physical hardware it runs on. This seemingly simple abstraction provides several advantages in data center design. Fundamentally, virtualization has enabled server consolidation, isolation of application stacks, creation of simplified test infrastructures and containers that ease the maintenance of legacy software, without requiring legacy hardware. More fundamentally, the decoupling of the operating system from physical hardware creates the ability to transparently migrate an operating system with a running application stack between systems in response to load or failure. A number of open and closed source virtualization solutions are available in the market today from e.g., Microsoft (Hyper-V), VMWare (ESX), Oracle (VirtualBox), Citrix (Xen) and RedHat (KVM). Virtualization is also the enabling technology behind cloud computing, and public and private cloud solutions based on virtualization technologies are available from e.g., Amazon (EC2), Microsoft (Azure), Rackspace (Openstack) and VMWare (vCloud).

While cloud computing in the largest infrastructures has now scaled to hundreds and thousands of servers, its true potential is stymied by the inflexibility of current data-center networks. While it is possible to live-migrate virtualized servers without interrupting running applications and network connections, the network configuration is too rigid to be modified adaptively. Multiple routers, switches and end hosts have to be re-configured on the fly. This network rigidity is an artifact of fundamental limitations in TCP/IP protocols that power much of today's networking. More fundamentally, while servers have been virtualized, networking technology has not, resulting in a tight coupling of a virtual machine to the physical network it runs on.

Accordingly, there is a need to eliminate this coupling, thereby enabling network endpoints to move (migrate) independent of the physical networks they run on.

A major limitation of current networks comes from the original design of IP (Internet Protocol) addressing. An IP address is both a unique end point identifier and a location identifier. As an end point identifier, the IP address uniquely identifies one end of a communication pipe. By encoding a network address within the IP address (IP addresses fundamentally have a network component and a host component), the IP address also determines the location of the end point.

This issue becomes evident, for example, when a machine (virtual or physical) needs additional computer resources to handle high application load, but there is no spare capacity on its physical host. To get greater capacity, the machine needs to be migrated to another physical system. While migrating, however, the machine needs to retain its IP address so that currently active network connections would not fail and other hosts that are communicating with the machine can still reach it. Since the IP address also defines how to get (i.e., route) to the host, the machine can migrate only within the same subnetwork and Layer 2 (L2) domain. The crux of the problem is that the IP address defines how to get to the machine, meaning that the machine cannot migrate across subnetworks because there would be no mechanism to route to the new location. This situation can be analogized using names. For example, if a person's name also included his/her zip code (e.g., Jim-22066), and the postal service used the zip code to route mail, then that person could not move across zip codes and still get mail delivery. This is the state of IP addressing today.

Thus, migration capability today is currently limited by the physical network. If there is no spare capacity available in an entire subnetwork, an overloaded machine cannot be scaled-up even if there is spare capacity available in adjacent subnetworks. Another alternative strategy is to design very large subnetworks, such that this issue is avoided in the first place—this is akin to creating very large zip codes in the Jim-22066 analogy above. However, large subnetworks create two issues. First, the most prevalent Layer 2 network—Ethernet—uses spanning trees for routing, which does not scale well. Second, a Layer 2 subnetwork is a single broadcast domain. Larger Layer 2 networks create excessive broadcast traffic. Current approaches to extend a Layer 2 network use virtual LANs (VLANs) to limit broadcast run into address bit limitations in 802.1Q frames. The current IEEE 802.1Q frame allocates 12 bits for a VLAN tag, limiting it to 4096 unique VLANs. This is a limitation for large multi-tenant clouds like Amazon, for example, which can have only 4096 unique subnets. VLANs also incur higher latency and management costs on its switches.

There are multiple competing standards proposals viz. VXLAN, NVGRE, STT that are attempting to solve the network limitation problems discussed above. All of these proposals, however, rely on the same basic idea of encapsulating the Layer 2 frame in an IP (Layer 3 or L3) packet. VXLAN uses UDP, STT uses TCP and NVGRE uses GRE tunnels for the encapsulation. Extending the Jim-22066 analogy from above, if Jim moves to zip code 20190, leading to his new address of Jim-20190, all of these approaches will still refer to Jim as Jim-22066 and then take the mail sent to Jim-22066 and stick it in another envelope (encapsulation) addressed to Jim-20190. At the destination, Jim peels off the outer envelope, finds another envelope addressed to Jim-22066 and uses this envelope to access the mail. Note that in all these approaches, Jim still remains Jim-22066. It is the outer envelope that enables Jim to move, but the fundamental problem where Jim was associated with his zip code still remains.

Furthermore, all three of the above standards approaches suffer from the following major limitations:

1. Encapsulation Overhead: Software encapsulation on hypervisor is expensive and consumes CPU cores, which otherwise can be used for running virtual machines. If hardware encapsulation is used, existing switches in the datacenter will need to be replaced.

2. Hardware upgrades: When the virtual machines communicate with hosts outside the data center, which do not use these protocols, a hardware gateway is needed to transparently introduce and remove encapsulation.

3. Middleware boxes: Since encapsulation changes the wire packet format, existing network middleware boxes like load balancers, intrusion detection systems and firewalls do not work. Since many of these standards proposals are in their infancy, there are no hardware solutions for many of these applications.

DETAILED DESCRIPTION

One solution to the problems associated with the dual nature of IP addresses, where the addresses represent both end point addresses as well as locations, would be to make the addresses globally unique with no location information encoded within them. Unfortunately, this would require fundamental changes to how IP networks work, requiring every one of the billions of devices connected to the Internet today to support the new semantics of IP addresses. This solution, therefore is not feasible.

Instead, the solution disclosed herein relies on splitting the dual purpose of an IP address. For example, every machine (virtual or physical) in the datacenter is associated with two addresses, a unique end point IP address (referred to herein as a "logical IP address"), which is used to identify the machine and a location IP address (referred to herein as "a physical IP address"), which determines where the machine exists and consequentially, how to route to the machine. The logical IP address associated with a machine never changes and is independent of the location of the address. The physical address changes depending on the location of the machine and can thus be used to route data to it. According to the disclosed scheme, this mapping is a one-to-one mapping. At any given point in time, every logical IP address has a corresponding physical IP address. Referring again to the Jim-22060 analogy, since the naming convention (i.e., the semantics of an IP address) cannot be changed and must be in the form of Name-Zip, the disclosed principles will create two names—a logical name and a physical name—and associate them. In this analogy, when routing mail, the name (i.e., identity) is selected from the logical name while the zip code is selected from the physical name, in effect achieving the equivalent of decoupling Jim from his zip code.

To implement the scheme disclosed herein, a mapping table (referred to herein as a "location table" or "LT") is provided. The location table maps a logical IP address to a physical IP address for all the machines in a domain such as e.g., a data center. While the logical IP address of a machine does not change, its physical IP address may change as the machine migrates from one network (or subnetwork) to another. Each machine (whether it is a physical machine or a hypervisor in a virtualized environment) has the ability to access the location table, which is consistent across the entire environment.

According to the disclosed principles, the location table can be made consistent throughout a domain in one of many ways—keeping a centralized copy, using broadcasts to reliably update distributed copies of the table (each node has its own copy of the location table), querying location table entries from a centralized entity (with one or more caching layers) on demand or any one of the well-known methods to achieve consistency of distributed data.

Table 1 illustrates an example structure of the location table, which consists of logical IP addresses mapped to physical IP addresses. As will be discussed below in more detail, in accordance with the disclosed principles, when a machine is migrated from one network (or subnetwork) to another, the mapping between the logical and physical IP addresses changes. When a machine migrates from one network to another, the logical IP address entry for a machine (which does not change) is now mapped to a new physical IP address that corresponds to the new location of the machine.

TABLE 1

Example Location Table Mapping Logical
IP Addresses To Physical IP Addresses.

| Logical IP | Physical IP |
|---|---|
| 184.180.15232 | 10.1.1.1 |
| 192.168.10.74 | 10.2.1.196 |
| 192.168.10.130 | 10.2.3.3 |

In effect, the disclosed principles create an IP overlay network comprising logical IP addresses over a physical IP network of physical IP addresses. Other than the one to one mapping of logical IP addresses to physical IP addresses, there is no other relationship requirement, either implicit or explicit, in the address formats of the logical and physical IP addresses. For instance, logical and physical IP addresses may come from different or similar address pools. Software or hardware switches can then create subnetworks of logical IP addresses (similar to subnetworks of physical IP addresses) including elements in software or hardware that can route between these subnetworks. In effect, logical IP addresses form a true overlay network with the ability for similar functionality as physical IP networks. Accordingly, the disclosed mapping mechanism and the rules that enable transparent migration of network elements is referred to herein as an "adaptive overlay network" or "AON".

As will become apparent from the following description, benefits of the disclosed principles are achieved without requiring or using encapsulation, thereby creating a new method for designing and deploying overlay networks. Moreover, it should be appreciated that the techniques disclosed herein do not rely on hypervisors or virtualization technology for their operation. The disclosed adaptive overlay network is a technique for virtualizing networks independent of whether the network consists of physical machines or virtual machines—the disclosed technology can be deployed independent of server virtualization. The disclosed principles directly change the target and source IP addresses within the hypervisor and do not have the VXLAN requirement of modifying the VTEP entry point during migration. Some prior art solutions attempt to use complete virtual switches in each hypervisor with all virtual machines sending their traffic to the virtual switch, which then ensures that the packet gets to the first VXLAN gateway (VTEP). The technique disclosed herein does not require virtual switches because it directly changes the target and source IP addresses within the hypervisor and does not have the VXLAN requirement of modifying the VTEP entry point during migration.

Figure 1:
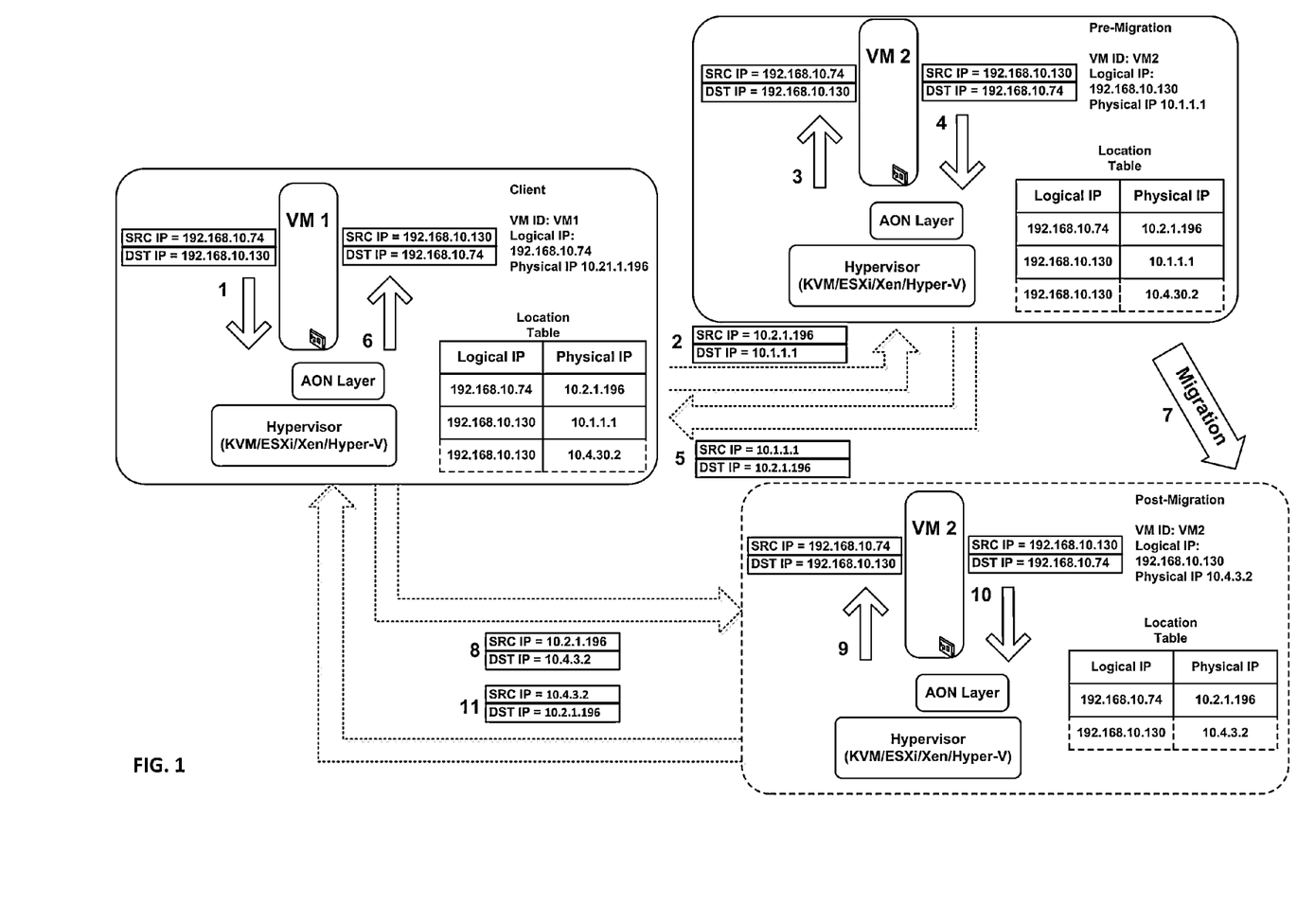
FIG. 1 illustrates example locations of the disclosed translation layer in example virtualized and physical environments in accordance with the disclosed principles.
Figure 2:
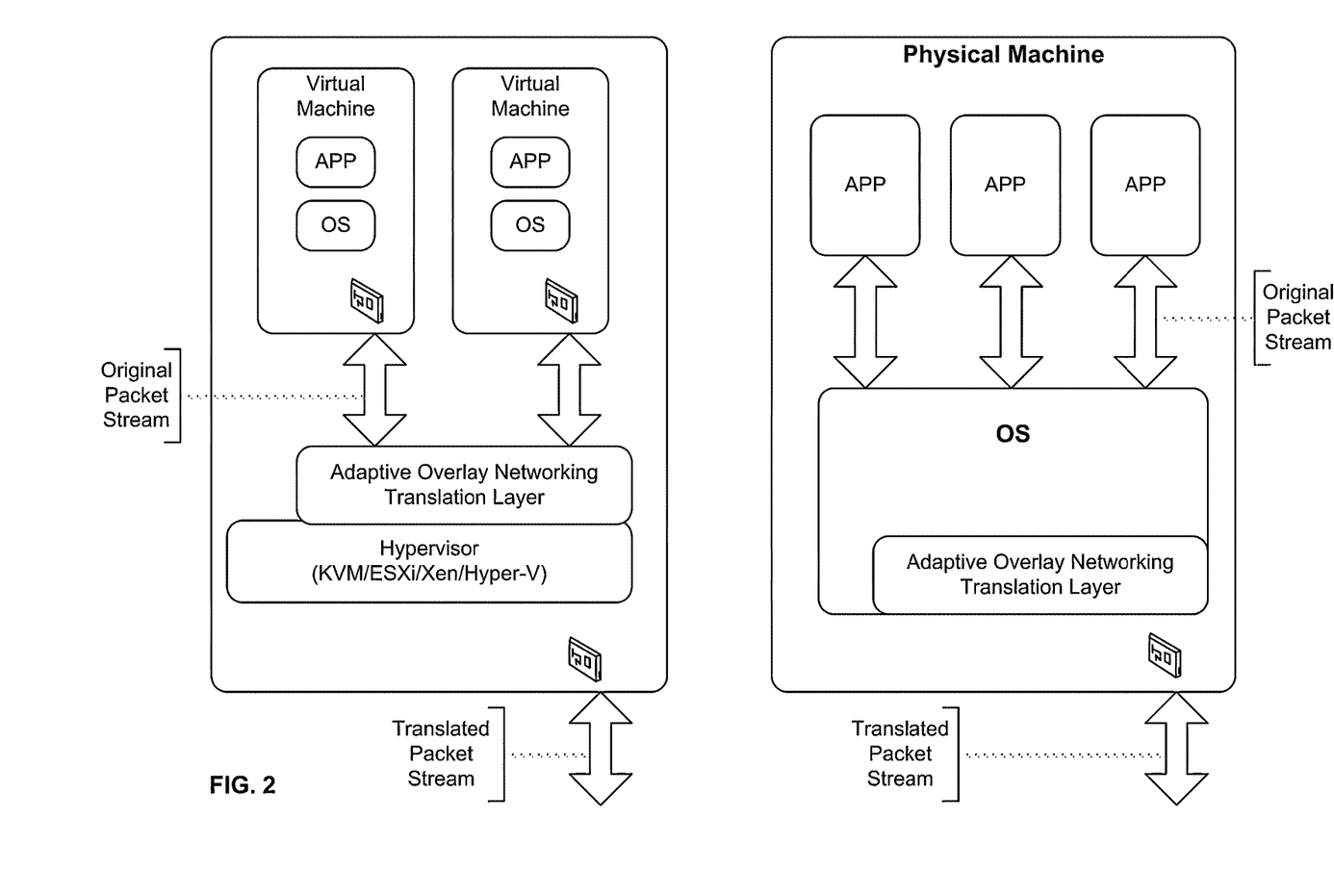
FIG. 2 illustrates example translations and routing, performed in accordance with the principles disclosed herein, between two communicating endpoints that are part of the same adaptive overlay network (AON).
Figure 3:
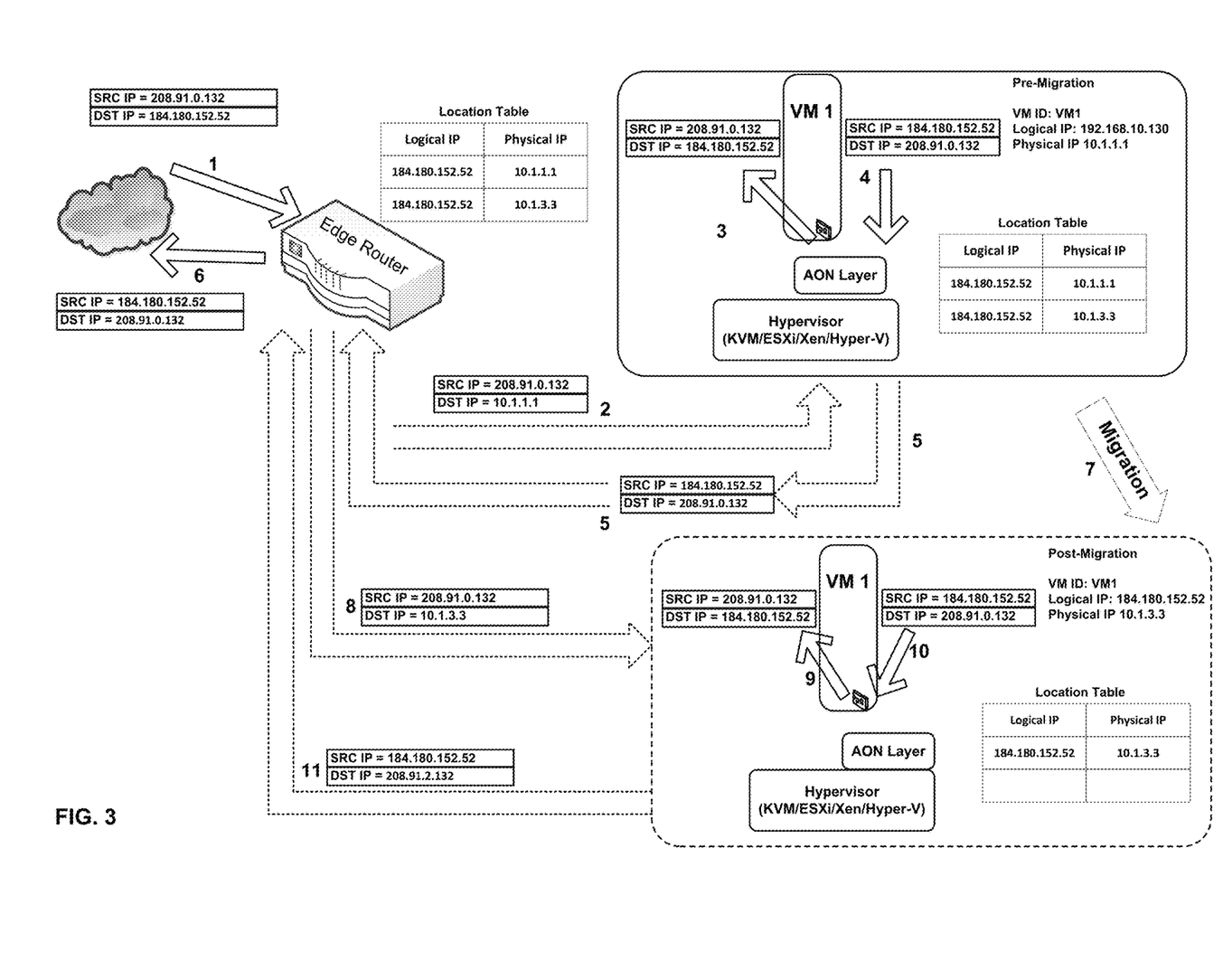
FIG. 3 illustrates example translations and routing, performed in accordance with the principles disclosed herein, between two communicating endpoints where one endpoint is part of an adaptive overlay network (AON) and the other endpoint is part of a public network such as the Internet.

FIG. 1 shows the location of a translation layer (also referred to herein as an "AON layer" as shown in FIGS. 2 and 3) that includes and uses the location table to map logical IP addresses to physical IP addresses in accordance with the disclosed principles. In a virtualized environment 10, the translation layer 30 sits between the virtual machines 20 and the hypervisor 12. Alternatively, the translation layer 30 (and the location table) could sit partly or completely within the hypervisor, if so desired. In FIG. 1, each virtual machine 20 is shown as having applications 22, an operating system (OS) 24 and a security device (e.g., firewall) 26. It should be appreciated, however, that the principles disclosed herein are not to be limited to a specific virtual machine configuration and that other suitable configurations may be used. All that is required is for the virtual machine 20 to be able to implement the disclosed principles as set forth herein. Virtual machines 20 use logical IP addresses that are inserted into a data packet or packet stream 28 and the translation layer 30 transforms the logical IP addresses to physical IP addresses before sending/receiving the data packet/stream 40 based on the rules set forth below with respect to FIGS. 2 and 3.

In a physical machine 50, the translation layer 60 sits within the operating system 54. The operating system 54 and applications 52 running on the machine 50 use logical IP addresses that are inserted into a data packet or packet stream 58 and the translation layer 60 transforms the logical IP address to a physical IP address before sending/receiving the data packet/stream 70 over the physical network interface. In FIG. 1, the physical machine 50 is shown as having applications 52, an operating system (OS) 54 and a security device (e.g., firewall) 56. It should be appreciated, however, that the principles disclosed herein are not to be limited to a specific physical machine configuration and that other suitable configurations may be used. All that is required is for the physical machine 50 to be able to implement the disclosed principles as set forth herein.

According to the disclosed principles, when the machine (virtual or physical) is provisioned, the location table is updated with an entry containing the logical IP address of the virtual machine and the physical IP address associated with it. As mentioned above, logical IP addresses belong to the overlay network and are arbitrarily user configurable. Logical IP addresses may be statically assigned or dynamically assigned by DHCP servers that reside on the overlay network. The physical IP address of any machine depends on the physical IP network that the machine resides in and may be statically assigned or dynamically assigned for example, by a DHCP server. After a location table entry is created, it is propagated to all machines in the overlay network. As described above, location table entries may be kept consistent using either centralized or decentralized techniques (such as the examples noted above) to achieve the desired consistency. All that is required is that an index into/lookup of a location table entry produce the same mapping result in each machine of the overlay network.

It should be appreciated that routing on the overlay network in accordance with the disclosed principles should be considered in view of two possible scenarios. In the first scenario, sending and receiving end points are both on the adaptive overlay network—i.e., routing within the adaptive overlay network (discussed below with reference to FIG. 2). In the second scenario, one end point is within the adaptive overlay network, while the second end point is on a public or other network (e.g., the Internet) and only has a single IP address as is common in machines today—i.e., routing outside the adaptive overlay network (discussed below with reference to FIG. 3).

FIG. 2 illustrates example translations and routing, performed in accordance with the principles disclosed herein, between two communicating endpoints that are part of the same adaptive overlay network (AON). In FIG. 2, two virtual machines VM1 and VM2 are attempting to communicate with each other. In the illustrated embodiment, the first virtual machine VM1 constitutes the first endpoint 220 while the second virtual machine VM2 constitutes the second endpoint 240*a*. As will be discussed below, in the illustrated example, the second virtual machine VM2 will eventually migrate to a different endpoint 240*b*. The virtual machines VM1, VM2 can be configured as illustrated in FIG. 1. It should be appreciated that one or more of the illustrated virtual machines could be physical machines and that the disclosed principles should not be limited to virtual machines. Physical machines can be configured as illustrated in FIG. 1.

In the adaptive overlay network (AON) framework disclosed herein, each virtual machine VM1, VM2 has a logical IP address assigned within the overlay network and a physical IP address that depends on the machine's actual location. In the illustrated example, the first virtual machine VM1 has a logical IP address of 192.168.10.74 and a physical IP address of 10.2.1.196. The second virtual machine VM2 has a logical IP address of 192.168.10.130 and a physical IP address of 10.1.1.1.

The mapping between the logical and physical IP addresses is stored in a location table. In the illustrated embodiment, a distributed location table is maintained on each node, and as described above the table must be kept consistent for each node. Alternatively, as described above, a centralized location table or on-demand lookups to access the entries in the location table may be used, if desired. In the illustrated example, a first location table 230 is at the first endpoint 220 and the same or consistent location table 230*a* is located at the second endpoint 230*a*. As described above with reference to FIG. 1, the tables 230, 230*a* would be stored in or associated with a translation layer of the virtual environment. In the illustrated example, the location tables 230, 230*a* initially comprise a first mapping entry 232 for the logical and physical IP addresses of the first virtual machine VM1 and a second mapping entry 234 for the logical and physical IP addresses of the second virtual machine VM2. As will be discussed later, when the second virtual machine VM2 migrates to a new physical IP address, the second mapping entry 234 will be replaced by a new mapping entry 236.

In accordance with the disclosed principles, when the first virtual machine VM1 sends a data packet to the second virtual machine VM2, the communication occurs over the overlay network using addresses allocated within the adaptive overlay network (AON). Hence, the data packet from the first virtual machine VM1 to the second virtual machine VM2 would contain a source IP address (SRC IP) of 192.168.10.74 and a destination IP address (DST IP) of 192.168.10.130 as shown at step 201. This packet is intercepted by the AON translation layer (shown as "AON layer" in FIG. 2) within the hypervisor of the virtual environment as discussed above with respect to FIG. 1 (or can be done on physical machines within the OS as shown in FIG. 1). At the sender (i.e., endpoint 220), the AON layer indexes the location table 230 by the source logical IP address and the destination logical IP address(es) and retrieves their corresponding physical IP addresses. The AON layer then replaces the logical IP addresses (source and destination) in the header of the original data packet with the retrieved physical IP addresses. In systems that do not deploy security protocols for preventing IP source address spoofing, the AON layer only needs to replace the destination IP address in the packet header, leaving the original logical source IP address in the header intact. For correctness in all deployment scenarios, both the source and destination logical addresses in the IP header are replaced, however, replacing just the destination address is sufficient in some cases. It should be appreciated that the source and destination logical IP addresses in the original data packet are directly replaced, i.e. the disclosed method is substituting the addresses in the IP header and not encapsulating the packet in another Layer 2 or Layer 3 packet.

In the illustrated example, the source logical IP address 192.168.10.74 is replaced with the source physical IP address 10.2.1.196 and the destination logical IP address 192.168.10.130 is replaced with the destination physical IP address 10.1.1.1. The transformed data packet is then transmitted over the physical network as shown at step 202. Since the IP addresses on the physical network are routable addresses, the data packet eventually reaches the destination (i.e., endpoint 240a) and is then intercepted by the AON layer of the virtual environment (or physical machine) at the destination. It should be appreciated that the physical IP addresses of the source and destination machines maybe on entirely different physical networks—the advantage of the disclosed method is that the physical IP addresses of the source and destination machines are routable addresses on the physical network and any correctly configured network will be able to deliver the packet to the destination.

Once the data packet reaches the destination (i.e., endpoint 240a), the AON layer "inverts the transformation" originally performed on the data packet at the first endpoint 220. To do this, the AON layer indexes the location table 230a by physical IP addresses (source and destination) and replaces the physical IP addresses in the IP packet it received with logical IP addresses from the table 230a. If only the destination IP address had been replaced, the "inversion" process only replaces the destination physical IP address with its corresponding logical address. In the illustrated example, at the destination virtual environment, the AON layer replaces the source physical IP address 10.2.1.196 with the source logical IP address 192.168.10.74 and the destination physical IP address 10.1.1.1 with the destination logical IP address 192.168.10.130. The AON layer then sends the packet to the second virtual machine VM2. The packet received by the second virtual machine VM2 is now validly formed and correctly contains source and destination IP address that are within the overlay network as shown in step 203.

Any data response from the second virtual machine VM2 to the first virtual machine VM1 follows the same steps as the communication from the first virtual machine VM1 to the second virtual machine VM2, but in reverse. The transformations performed for this communication are illustrated in the reverse path at steps 204, 205 and 206. Briefly, at step 204 the data packet from the second virtual machine VM2 to the first virtual machine VM2 would contain a source IP address (SRC IP) of 192.168.10.130 and a destination IP address (DST IP) of 192.168.10.74. This packet is intercepted by the AON layer, which indexes location table 230a by the source logical IP address and the destination logical IP address(es) and retrieves their corresponding physical IP addresses. The AON layer then replaces the logical IP addresses (source and destination) in the header of the original data packet with the retrieved physical IP addresses. The transformed data packet is then transmitted over the physical network as shown at step 205. The data packet reaches the destination (i.e., endpoint 220) and is intercepted by the AON layer of the virtual environment (or physical machine) at the destination. Once the data packet reaches the destination (i.e., endpoint 220), the AON layer "inverts the transformation" originally performed on the data packet at the second endpoint 240a by indexing the location table 230 by physical IP addresses (source and destination) and replacing the physical IP addresses in the IP packet it received with logical IP addresses from the table 230. The AON layer then sends the packet to the first virtual machine VM1 as shown in step 206.

When a virtual machine migrates from one physical system to another, it retains its original logical IP address, but the physical IP address may change if the virtual machine moves across physical networks. This scenario is shown at step 207 where the second virtual machine VM2 migrates from physical IP address 10.1.1.1 to physical IP address 10.4.3.2.

In accordance with the disclosed principles, before the migration is completed, a remapping request is sent to update the location tables 230, 230a. The remapping request changes the mapping between the logical IP address and its physical IP address. In the illustrated example, the location tables 230, 230a originally had a mapping between logical IP address of 192.168.10.130 and a physical IP address of 10.1.1.1 (in entry 234). Before the migration, the remapping request changes this mapping so that logical IP address 192.168.10.130 is bound to its new physical IP location 10.4.3.2 (entry 236). The effect of the remapping is shown in the dotted entry in the location table (note that entry 234 no longer exists as shown in the modified location table 230b in the migrated second endpoint 240b). This remapping step can be done just prior to or just after migration, but before any communication between any node on the adaptive overlay network (AON) and the newly migrated target (i.e., second virtual machine VM2).

A migration across physical systems may occur in the midst of a communication. Once the remapping is complete, the transformations on data packets transmitted from the first endpoint 220 to the new endpoint 240b are illustrated at steps 208 through 211. Even after the migration performed by the second virtual machine VM2, from the perspective of the first virtual machine VM1, to communicate with the second virtual machine VM2, the first virtual machine VM1 continues to send data to the same logical IP address on the overlay network. As mentioned above, the logical IP addresses do not change during migration, so the two virtual machines VM1, VM2 retain their original logical IP addresses (192.168.10.74 and 192.168.10.130, respectively) and as far as they are concerned, nothing has changed. However, the AON layer at both endpoints 220, 240b is aware of the migration and responds by changing the physical IP address associated with the logical IP address post migration. Thus, new packets from the first virtual machine VM1 to the second virtual VM2 at step 208 now have different physical IP address mapping (i.e., physical IP address 10.4.3.2 is used at step 208 as opposed to the physical IP address 10.1.1.1 used at step 202). Thus, packets sent from 192.168.10.74 to 192.168.10.130, after migration, will be transformed to source physical IP address of 10.2.1.196 and destination physical IP address of 10.4.3.2. As before, once the packet gets to the destination (i.e., endpoint 240b), the AON layer at the destination will invert the transformation by using the modified/updated location table 240b (at step 209) and deliver the packet to the second virtual machine VM2 with the source and destination addresses set to the respective logical IP addresses. Conversely, a communication from the second virtual machine VM2 to the first virtual machine VM1 post migration is shown at steps 210 and 211 (as discussed above with respect to steps 204-205 except using entry 236 for the post-migration mapping of the second virtual machine VM2).

FIG. 3 illustrates example translations and routing, performed in accordance with the principles disclosed herein, between two communicating endpoints where one endpoint is part of an adaptive overlay network (AON) and the other endpoint is part of a public network such as the Internet. Steps 301 through 306 show the transformations for communication before migration of the virtual machine VM1 from one hypervisor to another (i.e., from endpoint 340a to 340b) while steps 308 through 311 show the transformations needed after the migration (step 307). The dashed entry 334 in location tables 330, 330a shows the change in mapping between logical and physical IP addresses after the migration (discussed in more detail below). Before the migration logical IP address 184.180.152.52 is mapped to physical IP address 10.1.1.1 (entry 332 in tables 330, 330a) and after the migration this mapping is changed such that logical IP address 184.180.152.52 maps to physical IP address 10.1.3.3 (entry 334 in tables 330, 330a, 330b). The virtual machine VM1 can be configured as illustrated in FIG. 1. It should be appreciated that the illustrated virtual machine could be a physical machines and that the disclosed principles should not be limited to virtual machines. A physical machine, if used, can be configured as illustrated in FIG. 1.

The following describes the rules/processing required to route a communication between an endpoint 320 on a public network such as e.g., the Internet and an endpoint 340a within an adaptive overlay network (AON) in accordance with the disclosed principles. In FIG. 3, the public end point 320 has a single public IP address 208.91.0.132. The end point 340a within the adaptive overlay network (AON) has a logical IP address of 184.180.152.52. It should be appreciated that the logical IP address may be a publicly assigned static address i.e., it may be designed to be publicly routable as in the illustrated example. As described above, in an adaptive overlay network (AON), each logical IP address in the adaptive overlay network (AON) has a physical location dependent address. In the illustrated example, the end point 340a within the adaptive overlay network (AON) has a logical IP address of 184.180.152.52 and a physical IP address of 10.1.1.1 (pre-migration) and this mapping is present in the location tables 330a of the machines in the adaptive overlay network (AON).

When the public end point 320 (at 208.91.0.132) sends a data packet to IP address 184.180.152.52, the packet is routed over the Internet and arrives at an edge router 322 servicing the local network (step 301). On receiving the data packet, the edge router 322 accesses the location table 330 and replaces the destination IP address in the incoming packet (i.e., logical IP address 184.180.152.52) with the physical IP address 10.1.1.1 and sends it over the internal network (at step 302). It should be noted that only the destination IP address is changed in this scenario—the source IP address of 208.91.0.12 is retained without change. In alternate implementations, the transformation of the logical IP address 184.180.152.52 to the physical IP address 10.1.1.1 can occur in a software or hardware device just before the edge router.

The location table 330 can be implemented in the edge router by using "destination NAT (DNAT)" rules that can be specified in almost all managed routers available in the market today. A destination NAT rule tells the router to change the destination IP address in an IP data packet from one address to another and these rules are user configurable. By setting these rules on the edge router 322 dynamically, the principles disclosed herein work with almost all existing routers today and do not require new hardware or firmware modifications.

Within the internal network, the data packet eventually reaches the destination 10.1.1.1 (i.e., endpoint 340a) and is intercepted by the AON translation layer (shown as "AON layer" in FIG. 3). When the AON layer looks at the source IP address—in this case 208.91.0.132—, it will find no corresponding entry in its location table 330a. This indicates to the AON layer that the data packet originated outside the adaptive overlay network (AON). Based on this information, the AON layer only substitutes the destination physical IP address—in this case address 10.1.1.1—with the logical IP address 184.180.152.52 (from table 330a) and delivers the packet to the upstream virtual machine VM1 (step 303).

From the perspective of the virtual machine VM1, the virtual machine VM1 receives and recognizes a data packet that is correctly formed, originating from source IP address 208.91.0.132 and addressed to its IP address 184.180.152.52. When the virtual machine VM1 sends a data packet back to address 208.91.0.132 (at step 304), the AON layer intercepts the packet and indexes the location table 330a by the destination IP address 208.91.0.132. In this scenario, there is no entry with this address, indicating to the AON layer that the destination is outside the adaptive overlay network (AON); hence, the AON layer makes no changes to the source or destination IP addresses when one end point is within the AON and the other is outside the AON. Thus, as shown in step 305, the data packet sent from the virtual machine VM1 has a source IP address of 184.180.152.52 and a destination IP address of 208.91.0.132, and is sent to the edge router 322, which then sends it unchanged (step 306) over the Internet to the destination (i.e., endpoint 320). The destination thus receives a correctly formed packet that represents its original communication.

In an alternative embodiment, the AON layer can index the location table 330a by destination IP address, detect that the destination is outside the adaptive overlay network (AON) (by lack of a lookup match) and replace the source logical IP address 184.180.152.52 with the source physical address 10.1.1.1. In this alternative embodiment (not shown in the figure), the edge router 322 is programmed with a source NAT rule, which replaces the source IP address 10.1.1.1 with the logical IP address 184.180.152.52. This alternative embodiment may be useful in the presence of security devices that attempt to detect spoofing of source IP addresses.

When the virtual machine VM1 migrates from one physical network to another, the disclosed method simply changes the mapping for the logical IP address to a different physical IP address in the location table (see entry 334 in tables, 330, 330a, 330b). In the illustrated example, when VM1 migrates (step 307), the logical IP address 184.180.152.52 is mapped to a different physical IP address (10.1.3.3) in the location tables 330, 330a, 330b. It should be appreciated that this mapping also needs to be changed in the edge router 322. Once the mapping change is completed, the sequence of transformations is exactly the same as described above with respect to steps 301-306, except that the mapping of logical IP address 184.180.152.52 now occurs to the new physical IP address 10.1.3.3. The series of communication steps post migration is shown at steps 308-311 in FIG. 3.

The above examples presume that IP addresses generally have the same semantics as in current networks. In particular, in a single network each IP address is unique. If IP addresses are not unique, routers that only have visibility into source and destination IP addresses within packets have no way of distinguishing which of the many destinations having the same IP address a packet is destined to.

According to the adaptive overlay network disclosed herein, an alternate mechanism is provided that allows for non-unique logical IP addresses when source and destination machines are both within the adaptive overlay network. In the routing methods discussed above, the AON layer indexes the location table, when sending a packet, based on the destination logical IP address. In an alternative embodiment, referred to herein as ephemeral routing, the index/lookup mechanism is augmented by the use of additional attributes in the location table. For example, each machine can contain a numeric identifier that is not a part of the data packet, but simply associated with the port (i.e., virtual Ethernet device of a virtual machine, physical Ethernet device of a physical machine) that data is arriving on. For simplicity, the identifier is referred to herein as an organization identifier. Multiple machines that belong to the same organization have the same organization identifier. In this alternative method, looking up an address in the location table involves indexing by both destination logical IP address and the organization identifier. Thus, while IP addresses have to be unique within an organization (which is simply an arbitrary collection of machines with the same value for an arbitrary identifier), IP addresses across organizations need not be unique. Thus, a location table may contain two entries for the destination logical IP address 192.168.1.2, each with a different organization identifier (and different physical address). By sub-selecting between the multiple entries based on the correct organization identifier, the disclosed method can disambiguate the correct physical IP address that corresponds to the logical IP address and properly transform the packet for transmission. As described above, the same transformation occurs in reverse at the AON layer at the destination, with source address disambiguation now done by the same organization identifier. This technique is referred to herein as ephemeral routing, since routing disambiguation is achieved using information that is not part of the actual data packet and it works with no change to existing routers or routing protocols. One of the major advantages of ephemeral routing is that it enables tenants of cloud providers to reuse the same IP addresses for internal communication without fundamentally breaking existing routing protocols.

The general scenario of Layer 2 broadcasts in the adaptive overlay network disclosed herein is handled conventionally by Layer 2 in Layer 3 tunneling, using Layer 3 unicast (or a combination of unicast and layer 2 broadcast) to all machines with the same organization identifier. The location table is used to determine the subnet membership based upon the organization identifier, which specifies a broadcast domain. While this is a general scenario, it is rarely used in practice. The more common use case of Layer 2 broadcasts is for ARP queries to resolve the IP address to a MAC address. Since the location table already contains this information, the AON translation layer can respond to the ARP query without actually using a Layer 2 broadcast, i.e. the location table is used to implement proxy ARP. Another common use case for a Layer 2 broadcast is DHCP, the translation layer can similarly use the location table to resolve the addresses of DHCP server without resorting to Layer 2 broadcast—proxy DHCP.

The various embodiments described above have been presented by way of example, and not limitation. It will be apparent to persons skilled in the art(s) that various changes in form and detail can be made therein without departing from the spirit and scope of the disclosure. In fact, after reading the above description, it will be apparent to one skilled in the relevant art(s) how to implement alternative embodiments. Thus, the disclosure should not be limited by any of the above-described exemplary embodiments.

LIST OF ACRONYMS, ABBREVIATIONS, AND SYMBOLS

AON: Adaptive Overlay Networking
ARP: Address Resolution Protocol
DHCP: Dynamic Host Configuration Protocol
LT: Location Table
LT2: Layer two of seven-layered ISO Network Model (e.g. Ethernet)
LT3: Layer three of seven-layered ISO Network Model (e.g. IPV4)
MAC: Media Access Control (Layer 2 of ISO model)
NVGRE: Network Virtualization using Generic Routing Encapsulation
GRE: Generic Routing Encapsulation
STT: Stateless Transport Tunneling
TCP: Transmission Control Protocol
UDP: User Datagram Protocol
VLAN: Virtual Local Area Network
VM: Virtual Machine
VXLAN: Virtual Extensible Local Area Network

What is claimed is:

1. A method for overlay routing between an overlay network and a public network comprising: providing a mapping table that maps logical IP addresses to physical IP addresses for all machines in a domain, wherein the logical IP address and the physical IP address for each particular machine are represented by a same number of bits; for an inbound message from the public network to a first machine of the overlay network, the inbound message containing a first header identifying a physical IP address of a device from the public network as a source of the inbound message and a logical IP address of the first machine as destination of the inbound message, at an edge device, directly replacing the logical IP address of the first machine with the physical IP address of the first machine represented by a same number of bits using the mapping table; and at a first translation layer, directly replacing the physical IP address of the first machine with the logical IP address of the first machine represented by a same number of bits; wherein the first machine is a virtual machine and the mapping table is provided in a hypervisor of a virtual environment containing the virtual machine.

2. The method of claim 1, wherein the mapping table is provided to each machine of the overlay network.

3. The method of claim 1, wherein the mapping table is provided at a centralized location within the overlay network and accessible to all of the machines of the overlay network.

4. The method of claim 1, further comprising the step of updating the mapping table when the first machine migrates to a new physical address.

5. The method of claim 1, wherein the mapping table is indexed by the logical IP address of the first machine to obtain the physical IP address of the first machine from the table.

6. The method of claim 1, wherein the mapping table is indexed by the logical IP addresses and an organization identifier of the first machine to obtain the physical IP address of the first machine from the table.

7. An overlay network, comprising: a plurality of physical and or virtual machines associated with the overlay network; a mapping table that maps logical IP addresses to physical IP addresses for all machines associated with the overlay network, wherein the logical IP address and the physical IP address for each particular machine are represented by a same number of bits; and an edge router connected to a public network; wherein said edge router is adapted to, for an inbound message from the public network to a first machine of the overlay network, the inbound message containing a first header identifying a physical IP address of a device from the public network as a source of the inbound message and a logical IP address of the first machine as destination of the inbound message, directly replace the logical IP address of the first machine with the physical IP address of the first machine represented by the same number of bits using the mapping table, and wherein a translation layer at the first machine is adapted to directly replace the physical IP address of the first machine with the logical IP address of the first machine represented by the same number of bits; wherein the first machine is a virtual machine and the mapping table is provided in a hypervisor of a virtual environment containing the virtual machine.

8. The overlay network of claim 7, wherein the mapping table is provided to each machine of the overlay network.

9. The overlay network of claim 7, wherein the mapping table is provided at a centralized location within the overlay network and accessible to all of the machines of the overlay network.

10. The overlay network of claim 7, wherein the mapping table is updated when the first machine migrates to a new physical address.

11. The overlay network of claim 7, wherein the mapping table is indexed by the logical IP address of the first machine to obtain the physical IP address of the first machine from the table.

12. The overlay network of claim 7, wherein the mapping table is indexed by the logical IP addresses and an organization identifier of the first machine to obtain the physical IP address of the first machine from the table.

* * * * *